US008085877B2

(12) United States Patent
Rofougaran

(10) Patent No.: US 8,085,877 B2
(45) Date of Patent: Dec. 27, 2011

(54) METHOD AND SYSTEM FOR QUADRATURE LOCAL OSCILLATOR GENERATOR UTILIZING A DDFS FOR EXTREMELY HIGH FREQUENCIES

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 1084 days.

(21) Appl. No.: 11/864,837

(22) Filed: Sep. 28, 2007

(65) Prior Publication Data

US 2009/0086851 A1 Apr. 2, 2009

(51) Int. Cl.
*H04L 27/00* (2006.01)
(52) U.S. Cl. ........ 375/324; 375/229; 375/232; 375/230; 455/214; 329/311
(58) Field of Classification Search ............ 375/230
See application file for complete search history.

(56) References Cited

U.S. PATENT DOCUMENTS

| | | | | |
|---|---|---|---|---|
| 5,801,589 | A * | 9/1998 | Tajima et al. ............ | 331/1 R |
| 6,032,028 | A * | 2/2000 | Dickey et al. ............ | 455/110 |
| 6,054,948 | A * | 4/2000 | Dean ...................... | 342/372 |
| 6,693,980 | B1 * | 2/2004 | Linder et al. ............ | 375/329 |
| 6,778,594 | B1 * | 8/2004 | Liu ........................ | 375/222 |
| 6,906,560 | B1 * | 6/2005 | Coleman et al. ......... | 327/105 |
| 2001/0033200 | A1 * | 10/2001 | Staszewski et al. ...... | 331/18 |
| 2002/0008588 | A1 * | 1/2002 | Khan ...................... | 331/18 |
| 2002/0132590 | A1 * | 9/2002 | Marshall ................. | 455/73 |
| 2002/0150169 | A1 * | 10/2002 | Kishi ...................... | 375/295 |
| 2005/0012528 | A1 * | 1/2005 | Kodama .................. | 327/105 |
| 2005/0070236 | A1 * | 3/2005 | Paulus ..................... | 455/135 |
| 2005/0070239 | A1 * | 3/2005 | Paulus ..................... | 455/205 |
| 2006/0029152 | A1 * | 2/2006 | Kost et al. ............... | 375/295 |
| 2006/0068720 | A1 * | 3/2006 | Lee et al. ................ | 455/75 |
| 2006/0111071 | A1 * | 5/2006 | Paulus et al. ............ | 455/302 |
| 2007/0085612 | A1 * | 4/2007 | Kodama .................. | 331/16 |
| 2007/0159259 | A1 * | 7/2007 | Suh et al. ................ | 331/2 |
| 2008/0084336 | A1 * | 4/2008 | Wang et al. ............. | 341/51 |
| 2008/0113628 | A1 * | 5/2008 | Muhammad et al. .... | 455/77 |
| 2008/0132195 | A1 * | 6/2008 | Maxim et al. ........... | 455/334 |
| 2008/0181336 | A1 * | 7/2008 | Maxim .................... | 375/340 |
| 2008/0181340 | A1 * | 7/2008 | Maxim .................... | 375/346 |
| 2009/0086738 | A1 * | 4/2009 | Rofougaran ............. | 370/395.5 |
| 2010/0090886 | A1 * | 4/2010 | Beasley .................. | 342/200 |

* cited by examiner

*Primary Examiner* — Chieh M Fan
*Assistant Examiner* — Santiago Garcia
(74) *Attorney, Agent, or Firm* — McAndrews, Held & Malloy, Ltd.

(57) ABSTRACT

Methods and systems for a quadrature local oscillator generator utilizing a DDFS for extremely high frequencies. Aspects of one method may include utilizing the DDFS to generate a first signal that may comprise an in-phase (I) component and a quadrature phase (Q) component. A base signal may be divided to generate a second signal with an in-phase (I) component and a quadrature phase (Q) component. The I and Q components of the first and second signals may be mixed by a plurality of mixers, and the outputs of the mixers may be combined to generate an in-phase component of a local oscillator signal and a quadrature phase component of the local oscillator signal. The frequency of the local oscillator signal may be controlled by inverting or not inverting outputs of one or more of the mixers.

24 Claims, 6 Drawing Sheets

METHOD AND SYSTEM FOR QUADRATURE LOCAL OSCILLATOR GENERATOR UTILIZING A DDFS FOR EXTREMELY HIGH FREQUENCIES

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for a quadrature local oscillator generator utilizing a direct digital frequency synthesizer (DDFS) for extremely high frequencies.

BACKGROUND OF THE INVENTION

Wireless communication has become pervasive throughout our modern society, leading to crowding of allocated communication spectrums. Accordingly, new communication spectrums are being allocated and used for ever increasing applications. As higher transmission frequencies are used for various applications, circuitry for modulating signals to be transmitted and demodulating received signals may become more costly.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for a quadrature local oscillator generator utilizing a DDFS for extremely high frequencies, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a quadrature local oscillator generator utilizing a direct digital frequency synthesizer (DDFS) for extremely high frequencies. Aspects of the method may comprise utilizing the DDFS to generate a first signal, where a base signal may be processed to a lower frequency to provide a reference clock for the DDFS. The first signal may comprise an in-phase (I) component and a quadrature phase (Q) component. The base signal may also be processed by a second divider block, and the divided signal may be used to generate a second signal with an in-phase (I) component and a quadrature phase (Q) component. An I component of the first signal and a Q component of the second signal may be mixed to generate a third signal. An I component of the second signal and a Q component of the first signal may be mixed to generate a fourth signal. The I component of the first signal and the I component of the second signal may be mixed to generate a fifth signal. The Q component of the first signal and the Q component of the second signal may be mixed to generate a sixth signal.

The third signal and the fourth signal may then be combined to generate an in-phase component of a local oscillator signal, and the fifth signal and the sixth signal may be combined to generate a quadrature phase component of the local oscillator signal. The in-phase and quadrature components of the local oscillator signal may be used for up-conversion and/or down-conversion during transmission and reception, respectively.

Figure 1:
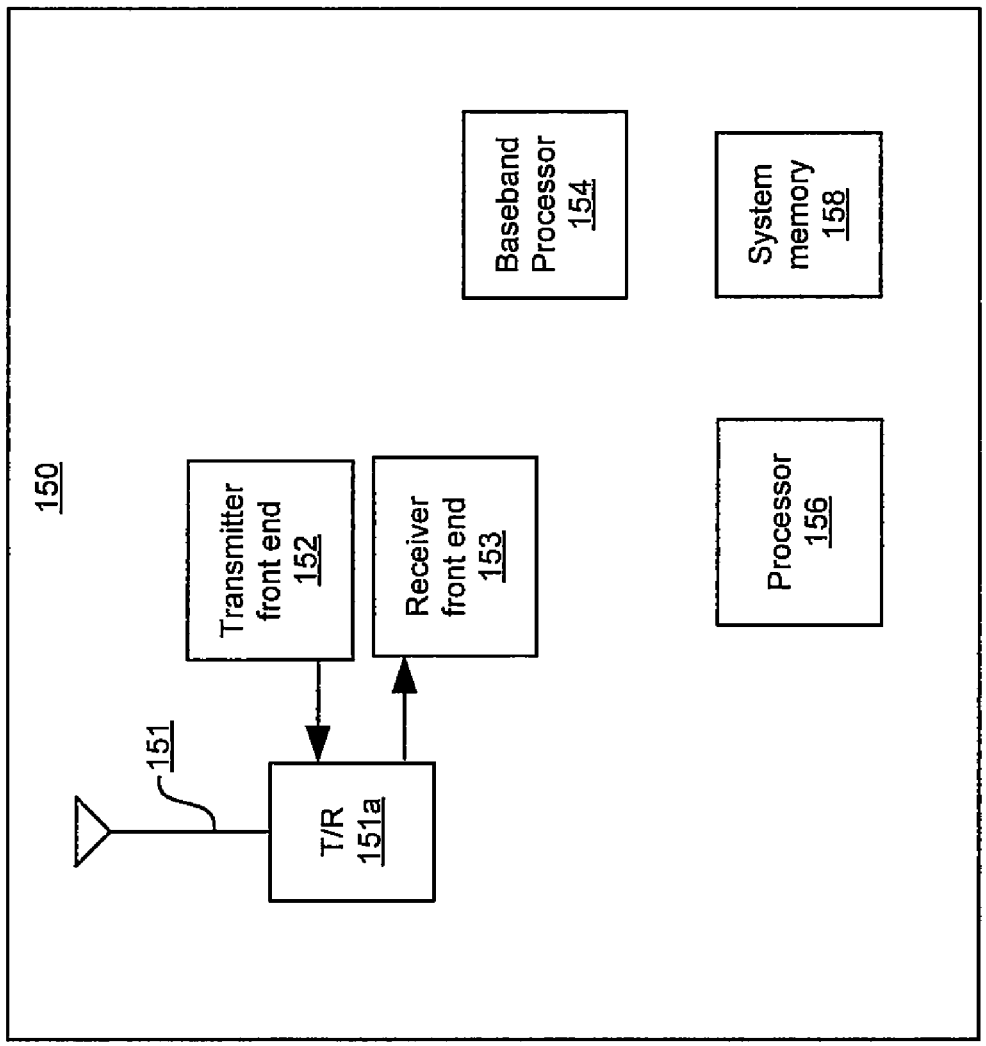
FIG. 1 is a block diagram of an exemplary wireless system, in accordance with an embodiment of the invention.

FIG. 1 is a block diagram of an exemplary wireless system, in accordance with an embodiment of the invention. Referring to FIG. 1, the wireless system 150 may comprise an antenna 151, a transmitter/receiver switch 151a, a transmitter front end 152, a receiver front end 153, a baseband processor 154, a processor 156, and a system memory 158. The transmitter/receiver (T/R) switch 151a may comprise suitable circuitry that enables the antenna 151 to be used for both receiving and transmitting. The transmitter front end (TFE) 152 may comprise suitable logic, circuitry, and/or code that may be adapted to up-convert a baseband signal directly to a radio frequency (RF) signal and to transmit the RF signal via the antenna 151. The TFE 152 may also be adapted to up-convert a baseband signal to an intermediate frequency (IF) signal, and/or up-convert the IF signal to a RF signal and then transmit the RF signal via the antenna 151. The TFE 152 may generate, for example, a local oscillator signal that may be used for the up-conversion. The local oscillator signal may be generated up to and including extremely high frequencies using, for example, a quadrature local oscillator generator utilizing direct digital frequency synthesizer (DDFS). The TFE 152 may be adapted to execute other functions, for example, filtering the baseband signal, and/or amplifying the baseband signal.

The receiver front end (RFE) 153 may comprise suitable logic, circuitry, and/or code that may be adapted to down-convert a RF signal directly to a baseband signal for further processing. The RFE 153 may also be adapted to down-convert a RF signal to an IF signal, and/or down-convert the IF signal to a baseband signal for further processing. The RFE 153 may generate, for example, a local oscillator signal that may be used for the down-conversion. The local oscillator signal may be generated up to and including extremely high frequencies using, for example, a quadrature local oscillator generator utilizing DDFS. The RFE 153 may be adapted to execute other functions, for example, filtering the baseband signal, and/or amplifying the baseband signal.

The baseband processor 154 may comprise suitable logic, circuitry, and/or code that may be adapted to process baseband signals, for example, convert a digital signal to an analog signal, and/or vice-versa. The baseband processor 154 may also provide control, for example, for generating a local oscillator signal using, for example, a quadrature local oscillator generator utilizing DDFS. The processor 156 may be a suitable processor or controller such as a central processing unit (CPU) or digital signal processor (DSP), or any type of integrated circuit processor. The processor 156 may comprise suitable logic, circuitry, and/or code that may be adapted to control the operations of the TFE 152 and/or the baseband processor 154. For example, the processor 156 may be utilized to update and/or modify programmable parameters and/or values in a plurality of components, devices, and/or processing elements in the TFE 152 and/or the baseband processor 154. The processor 156 may also provide control, for example, for generating a local oscillator signal using, for example, a quadrature local oscillator generator utilizing DDFS. Furthermore, if the wireless system 150 comprises more than one processor, control and/or data information, which may include the programmable parameters, may be transferred from at least one controller and/or processor to the processor 156. Similarly, the processor 156 may be adapted to transfer control and/or data information, which may include the programmable parameters, to at least one controller and/or processor, which may be part of the wireless system 150.

The processor 156 may utilize the received control and/or data information, which may comprise the programmable parameters, to determine an operating mode of the TFE 152. For example, the processor 156 may be utilized to select a specific frequency for a local oscillator generator, or a specific gain for a variable gain amplifier. Moreover, the specific frequency selected and/or parameters needed to calculate the specific frequency, and/or the specific gain value and/or the parameters needed to calculate the specific gain, may be stored in the system memory 158 via the processor 156. The information stored in system memory 158 may be transferred to the TFE 152 from the system memory 158 via the processor 156. The system memory 158 may comprise suitable logic, circuitry, and/or code that may be adapted to store a plurality of control and/or data information, including parameters needed to calculate frequencies and/or gain, and/or the frequency value and/or gain value.

Figure 2A:
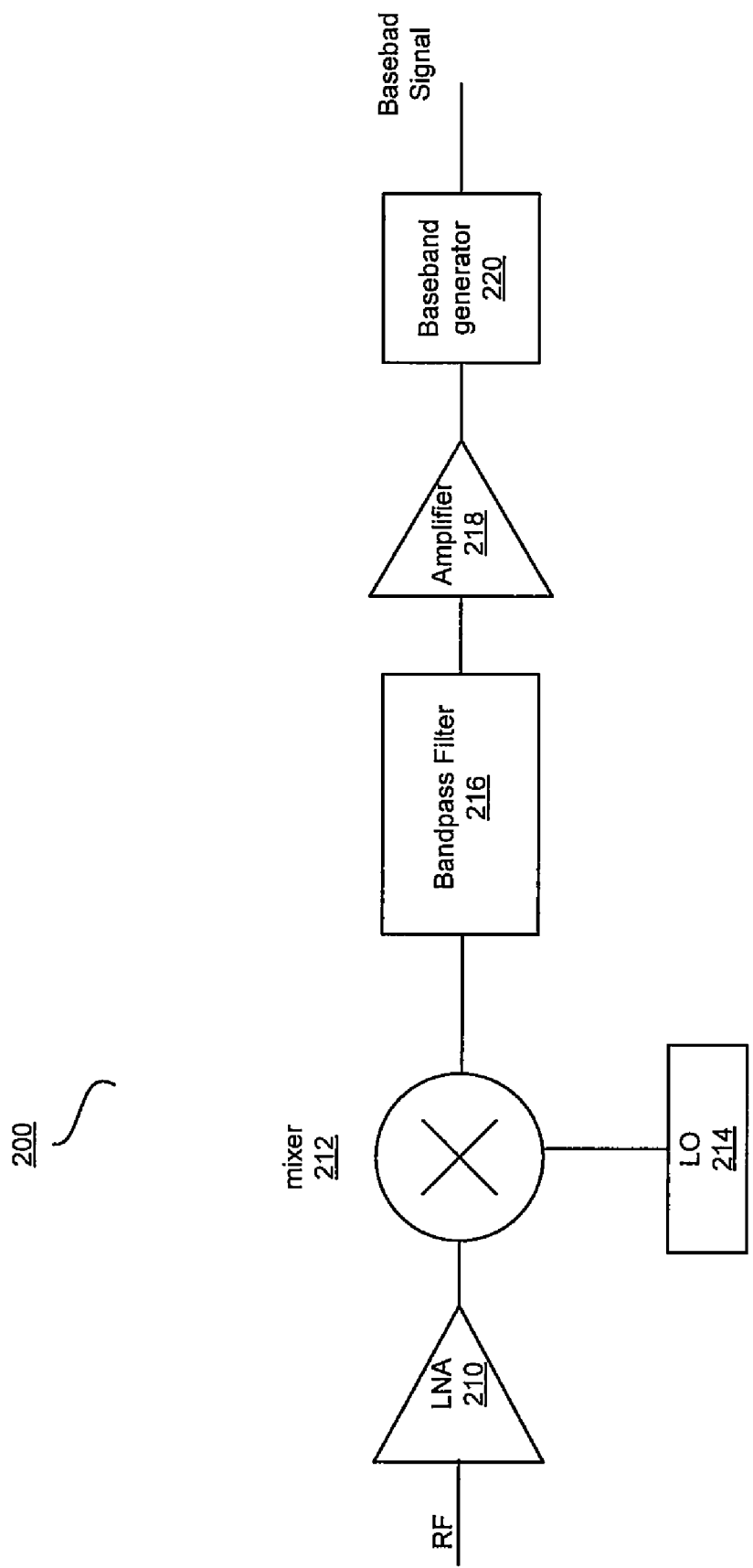
FIG. 2A is a block diagram illustrating an exemplary RF receiver front end, in accordance with an embodiment of the invention.

FIG. 2A is a block diagram illustrating an exemplary RF receiver front end, in accordance with an embodiment of the invention. Referring to FIG. 2A, there is shown an exemplary receive path 200 that comprises amplifiers 210 and 218, a mixer 212, a local oscillator (LO) generator 214, a bandpass filter 216, and a baseband generator 220. The amplifiers 210 and 218 may comprise suitable logic, circuitry, and/or code that may be adapted to amplify input signals and output the amplified signals. The amplifier 210 and/or the amplifier 218 may be a low noise amplifier (LNA). A LNA may be utilized in instances where the siqnal-to-noise ratio (SNR) may be relatively low, such as, for example, RF signals received by an antenna. The amplifiers 210 and 218 may also be variable gain amplifiers, where the gain control may be, for example, under a programmable control of the processor 156.

The mixer 212 may comprise suitable logic, circuitry, and/or code that may be adapted to receive two input signals, and generate output signals, where the output signals may be a difference of the frequencies of the two input signals and a sum of the frequencies of the two input signals.

The LO 214 may comprise suitable logic, circuitry, and/or code that may be adapted to output a signal of a specific frequency. The LO 214 is described in more detail with respect to FIGS. 3-5. The bandpass filter 216 may comprise suitable logic, circuitry, and/or code that may be adapted to selectively pass signals within a certain bandwidth while attenuating signals outside that bandwidth.

The baseband generator 220 may comprise suitable logic, circuitry, and/or code that may be adapted to generate analog baseband signal from the IF signal communicated by the amplifier 218. For example, analog down-conversion of the IF signal to analog baseband signal may comprise using a mixer (not shown) similar to the mixer 212. If the baseband processor 154 (FIG. 1) is a digital baseband processor, the analog baseband signal may be converted to a digital signal and communicated to the baseband processor 154. An analog-to-digital converter (ADC) (not shown) may be utilized to digitize the analog IF signal.

Digital down-conversion may comprise digitizing the IF signal, processing the digitized IF signal, for example, filtering and down-converting, to generate a digital baseband signal, which may then be communicated to the baseband processor 154. If the baseband processor 154 is an analog baseband processor, the digital baseband signal may be converted to an analog baseband signal and communicated to the baseband processor 154. A digital-to-analog converter (DAC) (not shown) may be utilized to convert the digital IF signal. The down-conversion of the digital IF signal to the digital baseband signal may utilize, for example, decimation filters where the input frequency of the decimation filter may be a multiple of the output frequency of the decimation filter. The digital filtering of the digital samples may utilize a derotator that may utilize a coordinate rotation digital calculation (CORDIC) algorithm.

In operation, the RF signal, which may have a carrier frequency referred to as $f_{RF}$, may be received by an antenna and communicated to the amplifier 210, where the RF signal may be amplified by the amplifier 210. The amplified RF signal may be communicated to an input of the mixer 212. The output signal of the LO 214, which may have a frequency of $f_{LO}=f_{RF}+f_{IF}$ or $f_{LO}=f_{RF}-f_{IF}$, may be communicated to another input of the mixer 212, where $f_{IF}$ may be a desired intermediate frequency. The mixer 212 may process the two input signals such that the output signal may have a desired frequency. The mixer 212 output signal may be referred to as an IF signal.

The IF signal may be communicated to a bandpass filter 216, which may be adapted to pass the desired bandwidth of signals about the IF frequency $f_{IF}$, while attenuating the undesired frequencies in the IF signal. The filtered IF signal may be amplified by the amplifier 218, and the amplified IF signal may be communicated to the baseband generator 220. The baseband signal output by the baseband generator 220 may be communicated to the baseband processor 154 for further processing. The processing may comprise, for example, filtering and/or amplifying.

Figure 2B:
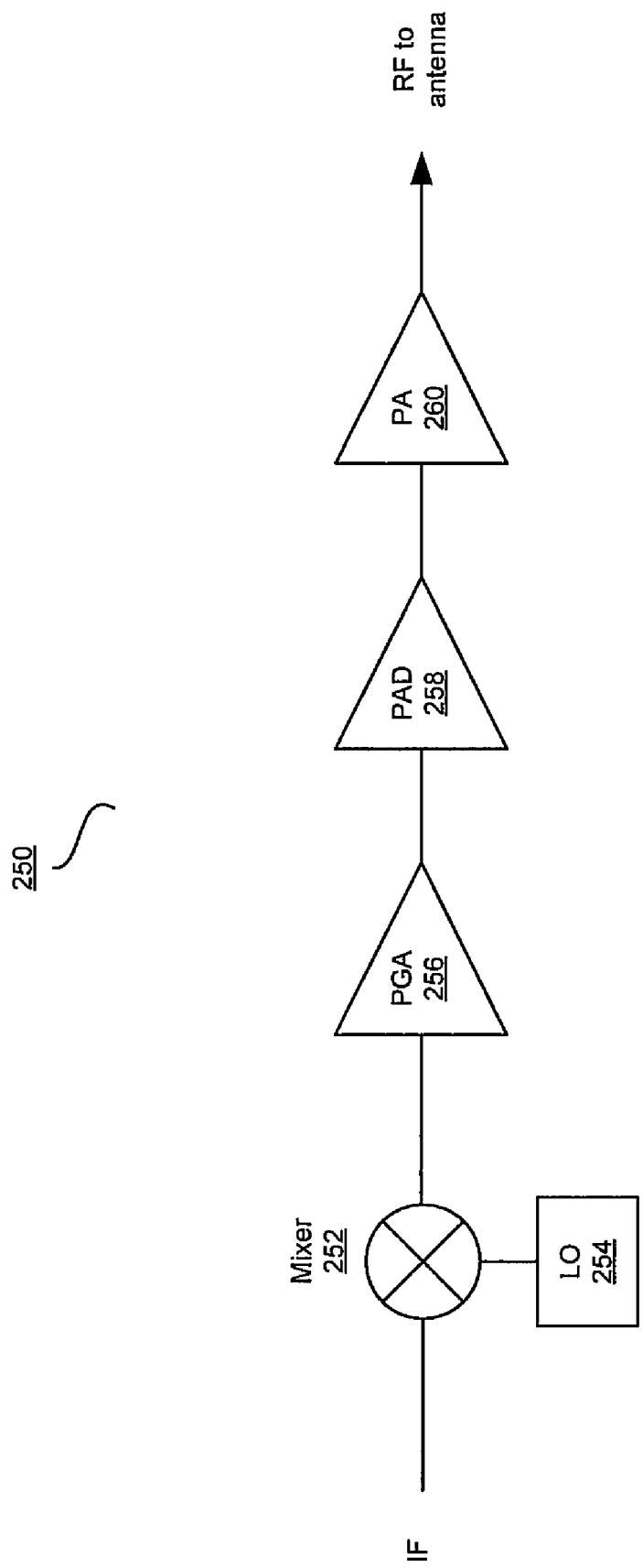
FIG. 2B is a block diagram illustrating an exemplary RF transmitter front end, in accordance with an embodiment of the invention.

FIG. 2B is a block diagram illustrating an exemplary RF transmitter front end, in accordance with an embodiment of the invention. Referring to FIG. 2B, there is shown an exemplary transmit path 250 that comprises a mixer 252, a local oscillator (LO) generator 254, a programmable gain amplifier (PGA) 256, a power amplifier driver (PAD) 258, and a power amplifier (PA) 260. The mixer 252 may upconvert a baseband signal to RF signal used for transmission using a mixing signal from the LO 254. The LO 254 is described in more detail with respect to FIGS. 3-5. The PGA 256 may amplify an input signal with variable gain to generate an output signal. The gain of the PGA 256 may be adjusted by circuitry and/or a processor, such as, for example, the baseband processor 154 or the processor 156. The PAD 258 and the PA 260 may each amplify an input signal to generate an output signal.

In operation, the input signal to the mixer 252 may be upconverted to radio frequency (RF), and the RF signal from the outputs of the mixer 252 may be communicated to the PGA 256. The mixer 252, the PGA 256, the PAD 258, and the PA 260 may comprise devices that amplify signals, for example. Accordingly, the RF signal may be amplified to a level sufficient for transmission.

Figure 3:
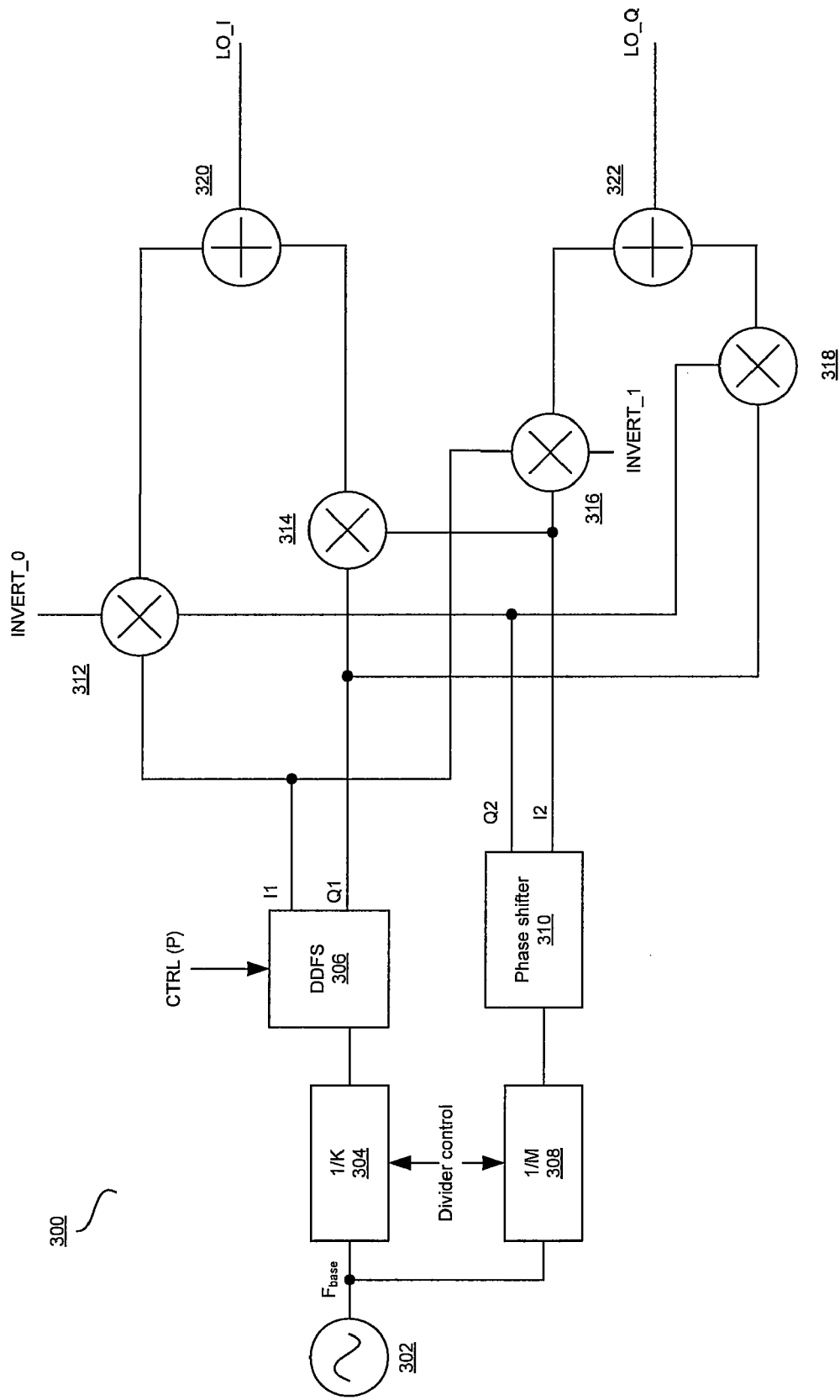
FIG. 3 is a block diagram of an exemplary quadrature local oscillator generator using DDFS, in accordance with an embodiment of the invention.

FIG. 3 is a block diagram of an exemplary quadrature local oscillator generator utilizing DDFS, in accordance with an embodiment of the invention. Referring to FIG. 3, there is shown a local oscillator generator 300 comprising a frequency source 302, divider blocks 304 and 308, DDFS 306, a phase shifter block 310, mixers 312, 314, 316, and 318, and signal combiners 320 and 322.

The frequency source 302 may comprise suitable logic and/or circuitry that may enable generation of a base signal $F_{base}$ at a specific frequency. The frequency source 302 may, for example, generate an output signal that may be variable in frequency, where the frequency may be controlled by a voltage signal. The divider blocks 304 and 308 may comprise suitable logic, circuitry, and/or code that may enable receiving an input signal and generating an output signal whose frequency may be divided by a divide factor N, where N may be 2 or more. The output signal generated by the divider block 304 may be used, for example, as a reference clock for the DDFS 306. The divider block 304 or 308 may receive a signal from the frequency source 302 having a frequency $F_{in}$, and output a signal having a frequency $F_{out}$:

$$F_{out} = \frac{F_{in}}{N} \quad [1]$$

where N may represent a divide factor utilized by the divider block 304 or 308. The divide factor N may be, for example, different for the divider block 304 than for the divider block 308. The divide factor N for each of the divider blocks 304 and 308 may be, for example, set to a specific value, or variable. The divide factor N may be determined by, for example, a processor such as the baseband processor 154 and/or the processor 156.

The DDFS 306 may generate at least one output signal that may be used to generate a LO signal for transmission and/or reception of RF signals by the wireless system 150. The DDFS 306 may output, for example, I and Q signals for generating I and Q local oscillator signals. The frequencies of the signals generated by the DDFS 306 may be controlled by, for example, a processor such as the baseband processor 154 and/or the processor 156. Operation of an exemplary DDFS is discussed with respect to FIG. 4.

The phase shifter block 310 may comprise suitable logic and/or circuitry that may enable receiving an input signal and generating two output signals where the two output signals may be, for example, 90° out of phase with respect to each other. The mixers 312, 314, 316, and 318 may comprise suitable circuitry that may enable mixing two signals to generate, for example, a signal that may comprise a sum of the frequencies of the two signals and a difference of the two signals. The mixers 312, 314, 316, and/or 318 may also enable the output signal to be inverted or not inverted. Whether the output signal is inverted or not may be controlled by, for example, the baseband processor 154 and/or the processor 156. The signal combiners 320 and 322 may comprise, for example, wire-ORing when the signals to be combined are currents. For example, since the mixers 312, 314, 316, and 318 may output current signals, the outputs of the mixers 312 and 314 may be directly electrically connected together to combine the currents output by the mixers 312 and 314. Similarly, the outputs of the mixers 316 and 318 may be combined by a similar configuration.

In operation, the frequency source 302 may generate a signal at a frequency that may be desired for use in generating the signals LO_I and LO_Q at the outputs of the signal combiners 320 and 322, respectively. The frequency source 302 may comprise, for example, a voltage controlled oscillator. The frequency of the frequency source 302 may be controlled by, for example, a processor such as the baseband processor 154 and/or the processor 156. The signal generated by the frequency source 302 may be communicated to the divider blocks 304 and 308.

The divider block 304 may divide the frequency of the input signal by an appropriate divide factor and communicate the reduced frequency signal to the DDFS 306. The divider block 308 may divide the frequency of the input signal by an appropriate divide factor and communicate the reduced frequency signal to the phase shifter block 310. Various embodiments of the invention may fix a divide factor by which the divider block 304 and/or the divider block 310 may divide an input frequency. Other embodiments of the invention may allow a divide factor by which the divider block 304 and/or the divider block 310 may divide an input frequency to be variable. For example, the baseband processor 154 and/or the processor 156 may control the divide factor by which the divider block 304 and/or the divider block 310 may divide an input frequency.

The DDFS 306 may receive the signal from the divider block 304 and may output a signal that comprises an in-phase component I1 and a quadrature phase component Q1. The in-phase component I1 may be communicated to the mixers 312 and 316, and the quadrature phase component Q1 may be communicated to the mixers 314 and 318. The phase shifter block 310 may receive a signal from the divider block 308 and output an in-phase component I2 and a quadrature phase component Q2. The in-phase component I2 may be communicated to the mixers 314 and 316, and the quadrature phase component Q2 may be communicated to the mixers 312 and 318.

The I1 and I2 components may be described as, for example, sin(A) and sin(B), and the Q1 and Q2 components may be described as, for example, cos(A) and cos(B). Accordingly, the mixer 312 may multiply the components I1 and Q2 to result in an output signal I1*Q2 that may be written as sin(A)*cos(B). By using a trigonometric identity, sin(A)*cos(B) may be written as ½[sin(A+B)+sin(A−B)]. Similarly, the mixer 314 may multiply the components I2 and Q1 to result in an output signal I2*Q1 that may be written as sin(B)*cos(A). By using a trigonometric identity, sin(B)*cos(A) may be written as ½[sin(B+A)+sin(B−A)]. The outputs of the mixers 312 and 314 may be combined by the signal combiner 320, and the result may be an in-phase component LO_I of a local oscillator signal, where the output may be expressed as:

$$LO\_I = 1/2[\sin(A + B) + \sin(A - B)] + 1/2[\sin(B + A) + \sin(B - A)] \quad [2]$$
$$= \sin(A + B) + 1/2[\sin(A - B)] + 1/2[\sin(B - A)]$$
$$= \sin(A + B) + 1/2[\sin(A)\cos(B) - \cos(A)\sin(B)] +$$
$$1/2[\sin(B)\cos(A) - \cos(B)\sin(A)]$$
$$= \sin(A + B).$$

When the mixer 312 outputs an inverted signal, then the in-phase component LO_I may be expressed as:

$$LO\_I = -1/2[\sin(A + B) + \sin(A - B)] + 1/2[\sin(B + A) + \sin(B - A)] \quad [3]$$
$$= -1/2[\sin(A - B)] + 1/2[\sin(B - A)]$$
$$= -1/2[\sin(A)\cos(B) - \cos(A)\sin(B)] +$$
$$1/2[\sin(B)\cos(A) - \cos(B)\sin(A)]$$
$$= -\sin(A)\cos(B) + \cos(A)\sin(B)$$
$$= -1/2[\sin(A + B) + \sin(A - B)] + 1/2[\sin(A + B) - \sin(A - B)]$$
$$= \sin(A - B).$$

Accordingly, by appropriately inverting or not inverting the output of the mixer 312, the in-phase component LO_I may comprise either the sum of the frequencies A and B or the difference of the frequencies A and B. The output of the mixer 312 may be inverted by asserting, for example, a signal INVERT_0, where the signal INVERT_0 may be communicated by the processor 156 and/or the baseband processor 154.

Similarly, output of the mixer 316 may be I1*I2, which may be written as sin(A)*sin(B). By using a trigonometric identity, sin(A)*sin(B) may be written as −½[cos(A+B)−cos(A−B)]. The mixer 318 may multiply the input components Q1 and Q2 to generate an output signal Q1*Q2 that may be written as cos(A)*cos(B). By using a trigonometric identity, cos(A)*cos(B) may be written as ½[cos(A+B)+cos(A−B)]. The outputs of the mixers 316 and 318 may be combined by the signal combiner 322, and the result may be the quadrature phase component LO_Q of the local oscillator signal, where the output may be expressed as:

$$LO\_Q = -1/2[\cos(A + B) - \cos(A - B)] + \quad [4]$$
$$1/2[\cos(A + B) + \cos(A - B)]$$
$$= \cos(A - B).$$

When the mixer 316 outputs an inverted signal, then the quadrature phase component LO_Q may be expressed as:

$$LO\_Q = 1/2[\cos(A + B) - \cos(A - B)] + \quad [5]$$
$$1/2[\cos(A + B) + \cos(A - B)]$$
$$= \cos(A + B).$$

Accordingly, by appropriately inverting or not inverting the output of the mixer 316, the quadrature phase component LO_Q may comprise either the sum of the frequencies A and B or the difference of the frequencies A and B. The output of the mixer 312 may be inverted by asserting, for example, a signal INVERT_1, where the signal INVERT_1 may be communicated by the processor 156 and/or the baseband processor 154.

Therefore, an embodiment of the invention may output the components LO_I and LO_Q of the local oscillator signal with a frequency that is a sum of the frequencies of the signals from the DDFS 306 and the phase shifter block 310 by generating an inverted output for the mixer 316. An embodiment of the invention may also output the components LO_I and LO_Q with a frequency that is a difference of the frequencies of the signals from the DDFS 306 and the phase shifter block 310 by generating an inverted output for the mixer 312. Whether the mixer 312 or 316 inverts its output signal may be controlled by, for example, a processor such as the baseband processor 154 and/or the processor 156. An embodiment of the invention described uses two signals INVERT_0 and INVERT_1. Other embodiments of the invention may use a single signal OUT_CONTROL that is communicated to the mixers 312 and 316. Accordingly, when the signal OUT_CONTROL is not asserted, the mixer 312 may output a non-inverted signal and the mixer 316 may output an inverted signal. When the signal OUT_CONTROL is asserted, the mixer 312 may output an inverted signal and the mixer 316 may output a non-inverted signal. Generation of the local oscillator signal components LO_I and LO_Q may be by, for example, quadrature mixing of the I and Q components.

While an embodiment of the invention has been described that comprises the divider blocks 304 and 308, the invention need not be so limited. For example, the base signal $F_{base}$ may be communicated to the DDFS 306 and/or the phase shifter block 310 without being divided by the divider block 304 and/or 308, respectively. Various embodiments of the invention may combine, for example, the divider block 308 and the phase shifter block 310 into a single functional block. Also, an embodiment of the invention is described where the mixers 312 and 316 are enabled to output inverted or non-inverted signals. However, the invention need not be so limited. For example, the inverting functionality may be executed by another functional block, such as, for example, the combiner blocks 320 and/or 322, or other functional blocks between the mixers 312 and 316 and the combiner blocks 320 and 322.

Figure 4:
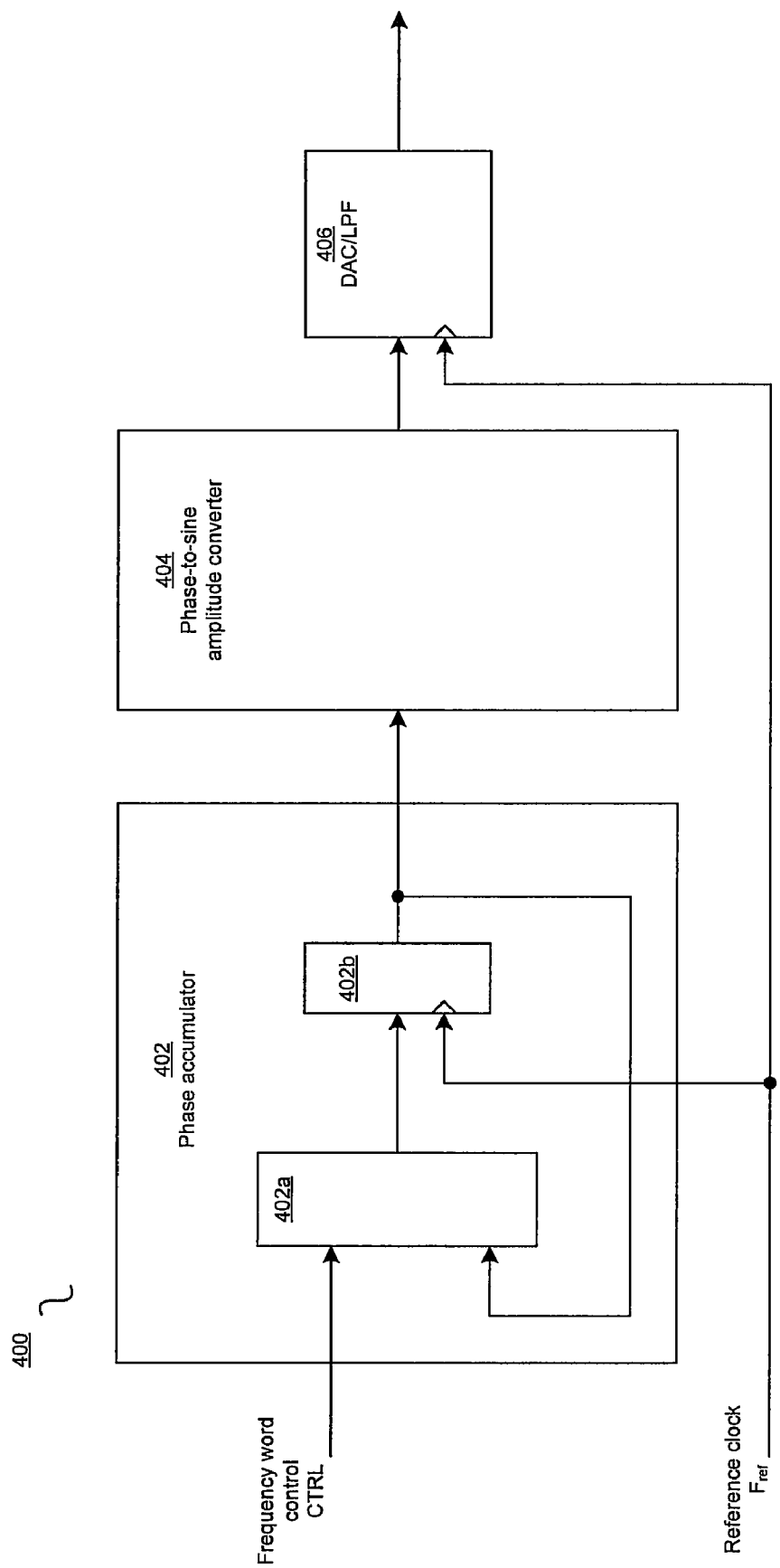
FIG. 4 is a block diagram illustrating an exemplary direct digital frequency synthesizer, in accordance with an embodiment of the invention.

FIG. 4 is a block diagram illustrating an exemplary direct digital frequency synthesizer, in accordance with an embodiment of the invention. Referring to FIG. 4, there is shown a direct digital frequency synthesizer (DDFS) 400 comprising a phase accumulator 402, a phase-to-sine amplitude converter 404, and a digital-to-analog converter (DAC) 406. The DDFS 400 may be similar in functionality to the DDFS 306. The phase accumulator 402 may comprise an adder 402a that may enable integrating an input signal, such as, for example, a frequency control word CTRL, by adding it to a previous integrated value stored in a register 402b on each cycle of a reference clock $F_{ref}$. The frequency control word CTRL may be provided by, for example, the processor 156 and/or the baseband processor 154. Various embodiments of the invention may also comprise a control word block (not shown) that may be used to provide the control word. The reference clock $F_{ref}$ may be communicated by, for example, the divider block 304. The reference clock $F_{ref}$ may be fixed-frequency or varying frequency. In the case of a varying reference clock $F_{ref}$, the change in frequency may be compensated by altering the frequency control word CTRL such that the output of the DDFS may comprise a desired frequency and/or phase.

The phase-to-sine amplitude converter 404 may comprise suitable logic, circuitry, and/or code that may enable converting the output of the phase accumulator 402 to an approximated sine amplitude. For example, the conversion may be achieved via a look-up table. Although only a single output may be shown for exemplary purposes, a plurality of signals may be generated where each signal may be phase shifted from the others. For example, where I and Q signals may be needed, the phase-to-sine amplitude converter 404 may utilize a plurality of different look-up tables for each input value. In an exemplary embodiment of the invention, a first look-up table may be utilized for the I signal and a second look-up table may be utilized for the Q signal.

The DAC 406 may comprise suitable logic and/or circuitry that may enable converting the digital output of the phase-to-sine amplitude converter 404 to an analog output. The DAC 406 may also comprise, for example, a low-pass filter that may be used to "smooth" the analog output. Where the DDFS 400 may generate, for example, I and Q signals, there may be a DAC for generating an I signal and a DAC for generating a Q signal. Accordingly, the DDFS 400 may be a digitally-controlled signal generator that may vary phase, frequency, and/or amplitude of one or more output signals based on a single reference clock $F_{ref}$ and a frequency control word CTRL.

In operation, the frequency control word CTRL may be provided to the adder 402a, and may be successively added to an integrated value stored in the register 402b. The adding may occur, for example, on each cycle of the reference clock $F_{ref}$. In this manner, the sum may eventually be greater than the maximum value the accumulator can store, and the value in the accumulator may overflow or "wrap". Accordingly, an N-bit phase accumulator 402 may overflow at a frequency $F_{out}$ given by the following equation:

$$F_{out}=(F_{ref}*CTRL)/2^N \qquad [6]$$

In this manner, the output of the phase accumulator 402, which may be referred to as $F_{out}$, may be periodic at a period of $1/F_{out}$ and may represent the phase angle of a signal. In this regard, the DDFS 422 may operate as a frequency generator that generates one or more sine waves or other periodic waveforms over a large range of frequencies, from almost DC to approximately half the reference clock frequency $F_{ref}$.

Prior to changing the frequency control word CTRL, the state of the DDFS 400 may be saved in, for example, a memory such as the system memory 158. In this manner, the output signal $F_{out}$ may be interrupted and then resumed without losing the phase information comprising the generated signals. For example, the DDFS 400 may resume generating the output signal $F_{out}$ using the saved state loaded from, for example, the system memory 158. Accordingly, the output signal $F_{out}$ may resume from the last phase angle transmitted before the signal was interrupted.

Figure 5:
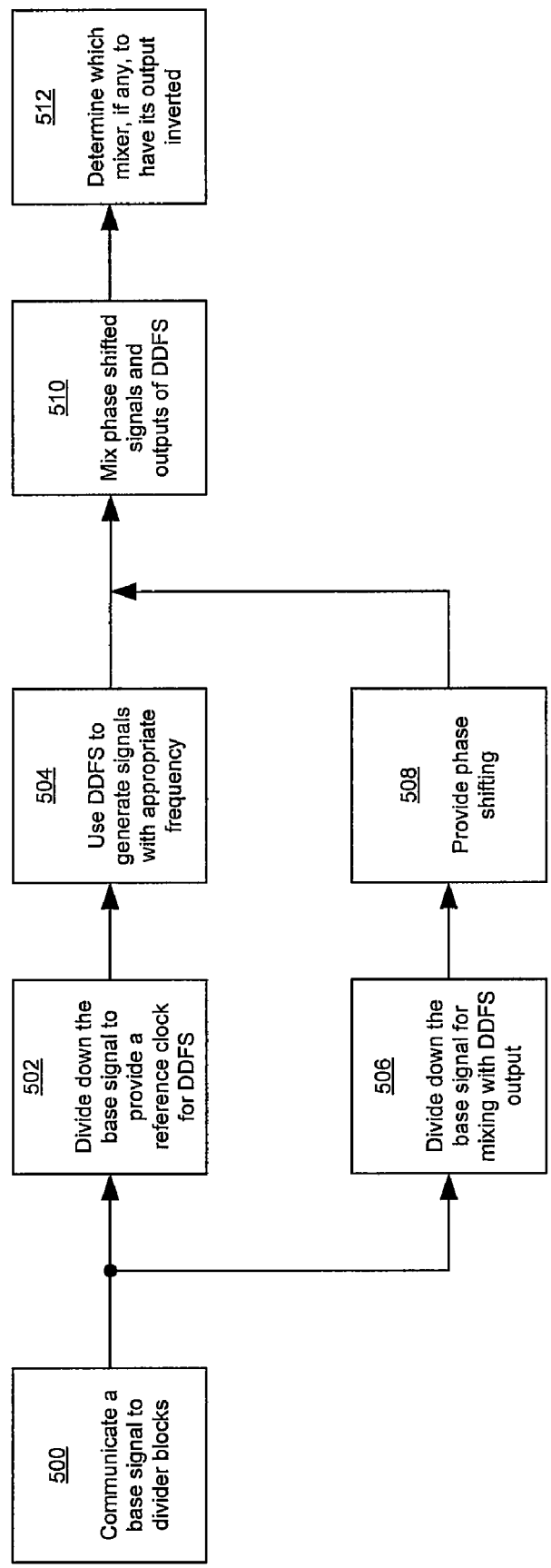
FIG. 5 is a flow diagram illustrating exemplary steps for using a quadrature local oscillator generator utilizing a DDFS for extremely high frequencies, in accordance with an embodiment of the invention.

FIG. 5 is a flow diagram illustrating exemplary steps for using direct digital frequency synthesizers for extremely high frequencies, in accordance with an embodiment of the invention. Referring to FIG. 5, there is shown steps 500 to 512. In step 500, the frequency source 302 may generate a signal $F_{base}$ with a desired frequency, where the desired frequency may be design dependent. The frequency of the generated signal may be divided in steps 502 and 506. In step 502, the divider block 304 may reduce the frequency of the input signal $F_{base}$, for example, by a divide factor K, such that the output of the divider block 304 may be a signal $F_{ref}$ where the frequency of the signal $F_{ref}$ may be $F_{base}/K$. The output signal $F_{ref}$ of the divider block 304 may be communicated to the DDFS 306 as a reference clock.

In step 504, the DDFS 306 may use the reference clock $F_{ref}$ to generate the in-phase and quadrature phase components I1 and Q1. The frequency of the output signal components I1 and Q1 may depend on the frequency control word CTRL that may be communicated to the DDFS 306 by, for example, the baseband processor 154 and/or the processor 156. The components I1 and Q1 may have a frequency that may be described by:

$$I1=Q1=F_{base}*(CTRL/(K*2^N)). \qquad [7]$$

The next step from step 504 may be step 510.

In step 506, the divider block 308 may reduce the frequency of the input signal $F_{base}$, for example, by a divide factor M, such that the output of the divider block 308 may have a frequency that may be $F_{base}/M$. In step 508, the output of the divider block 308 may be communicated to the phase shifter block 310. The phase shifter block 310 may output two signal components I2 and Q2 where the frequencies of the signal components I2 and Q2 may be the same as the frequency of the input signal. However, the signal components I2 and Q2 may have a phase difference of 90° with respect to each other. In step 510, the mixer 312 may mix the signal components I1 and Q2, the mixer 314 may mix the signal components I2 and Q1, the mixer 316 may mix the signal components I1 and I2, and the mixer 318 may mix the signal components Q1 and Q2.

In step 512, the output of the mixer 312 may be inverted or the output of the mixer 316 may be inverted by an asserted control signal to the mixers 312 and/or 316. By inverting the output of the mixer 312, the frequency of the signal components LO_I and LO_Q may be a difference of the frequencies of the signals generated by the DDFS 306 and the phase shifter block 310. By inverting the output of the mixer 316, the frequency of the signal components LO_I and LO_Q may be a sum of the frequencies of the signals generated by the DDFS 306 and the phase shifter block 310. Whether the mixer 312 or 316 inverts its output signal may be controlled by, for example, a processor such as the baseband processor 154 and/or the processor 156. Accordingly, by selecting an appropriate base signal generated by the frequency source 302, the output signals LO_I and LO_Q may range to the extremely high frequency (EHF) band. The output signal components LO_I and LO_Q may be used, for example, for down-conversion in the receiver front end 153 and/or up-conversion in the transmitter front end 152.

In accordance with an embodiment of the invention, aspects of an exemplary system may comprise the DDFS 306 that enables generation of a first signal, which may comprise the signal components I1 and Q1, based on a base signal. The base signal may be generated by the frequency source 302, which may be, for example, a voltage controlled oscillator. A reference clock signal may be communicated to the DDFS 306, where the reference clock signal may be the base signal reduced to a lower frequency by the divider block 304. The DDFS 306 may also be controlled by one or more frequency control words communicated by, for example, the processor 156 and/or the baseband processor 154. The frequency control word and the reference control clock may determine, for example, a frequency of the first signal generated by the DDFS 306. The phase shifter block 310 may receive an input signal, which may be the base signal reduced in frequency by the divider block 308, and generate a second signal that may comprise signal components I2 and Q2 by providing phase shift between the signal components I2 and Q2.

The signal component I1 of the first signal and the signal component Q2 of the second signal may be mixed by the mixer 312 to generate a third signal. The signal component I2 of the second signal and the signal component Q1 of the first signal may be mixed by the mixer 314 to generate a fourth signal. The signal component I1 of the first signal and the signal component I2 of the second signal may be mixed by the mixer 316 to generate a fifth signal. The signal component Q1 of the first signal and the signal component Q2 of the second signal may be mixed by the mixer 318 to generate a sixth signal.

The third signal and the fourth signal may be combined by the combiner block 320 to generate an in-phase component LO_I of a local oscillator signal. The fifth signal and the sixth signal may be combined by the combiner block 322 to generate a quadrature phase component LO_Q of a local oscillator signal. The signals LO_I and LO_Q may be used, for example, by the transmitter front end 152 and/or the receiver front end 153.

The third signal, which may be an output signal of the mixer 312, may be output as an inverted output signal or a non-inverted output signal. When the third signal is an inverted output signal, the in-phase component LO_I may comprise a frequency that is a difference of a frequency of the first signal and a frequency of the second signal. When the mixer 312 does not invert the third signal, the in-phase component LO_I may comprise a frequency that is a sum of a frequency of the first signal and a frequency of the second signal.

The fifth signal, which may be an output signal of the mixer 316, may be output as an inverted output signal or a non-inverted output signal. When the fifth signal is an inverted output signal, the quadrature phase component LO_Q may comprise a frequency that is a sum of a frequency of the fifth signal and a frequency of the sixth signal. When the mixer 316 does not invert the fifth signal, the quadrature phase component LO_Q may comprise a frequency that is a difference of a frequency of the fifth signal and a frequency of the sixth signal.

Another embodiment of the invention may provide a machine-readable storage, having stored thereon, a computer program having at least one code section executable by a machine, thereby causing the machine to perform the steps as described above for a quadrature local oscillator generator utilizing DDFS for extremely high frequencies.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for processing signals, the method comprising:

generating by a direct digital frequency synthesizer, a first signal based on a base signal;

generating by a phase shifter a second signal based on said base signal;

quadrature mixing in-phase (I) and quadrature phase (Q) components of said first signal and in-phase (I) and quadrature phase (Q) components of said second signal to generate a local oscillator signal comprising an in-phase (I) component and a quadrature phase (Q) component;

mixing said I component of said first signal and said Q component of said second signal to generate a third signal;

mixing said I component of said second signal and said Q component of said first signal to generate a fourth signal;

mixing said I component of said first signal and said I component of said second signal to generate a fifth signal;

mixing said Q component of said first signal and said Q component of said second signal to generate a sixth signal;

adding said third signal and said fourth signal to generate said in-phase component of said local oscillator signal; and adding said fifth signal and said sixth signal to generate said quadrature phase component of said local oscillator signal.

2. The method according to claim 1, comprising inverting said third signal to generate said in-phase component of said local oscillator signal whose frequency is a difference of a frequency of said first signal and a frequency of said second signal, wherein when said third signal is not inverted, said in-phase component of said local oscillator signal is generated with a frequency that is a sum of a frequency of said first signal and a frequency of said second signal.

3. The method according to claim 1, comprising inverting said fifth signal to generate said quadrature phase component of said local oscillator signal whose frequency is a sum of a frequency of said first signal and a frequency of said second signal, wherein when said fifth signal is not inverted, said quadrature phase component of said local oscillator signal is generated with a frequency that is a difference of a frequency of said first signal and a frequency of said second signal.

4. The method according to claim 1, comprising controlling said direct digital frequency synthesizer utilizing one or more frequency control words.

5. The method according to claim 1, comprising dividing said base signal by a divide factor greater than one to generate a reference clock signal for said direct digital frequency synthesizer.

6. The method according to claim 1, wherein said second signal is generated by dividing said base signal by a divide factor greater than one.

7. A non-transitory machine-readable storage having stored thereon, a computer program having at least one code section for processing signals, the at least one code section being executable by a machine for causing the machine to perform steps comprising:
generating by a direct digital frequency synthesizer, a first signal based on a base signal;
generating by a phase shifter a second signal based on said base signal;
quadrature mixing in-phase (I) and quadrature phase (Q) components of said first signal and in-phase (I) and quadrature phase (Q) components of said second signal to generate a local oscillator signal comprising an in-phase (I) component and a quadrature phase (Q) component;
mixing said I component of said first signal and said Q component of said second signal to generate a third signal;
mixing said I component of said second signal and said Q component of said first signal to generate a fourth signal;
mixing said I component of said first signal and said I component of said second signal to generate a fifth signal;
mixing said Q component of said first signal and said Q component of said second signal to generate a sixth signal;
adding said third signal and said fourth signal to generate said in-phase component of said local oscillator signal; and
adding said fifth signal and said sixth signal to generate said quadrature phase component of said local oscillator signal.

8. The non-transitory machine-readable storage according to claim 7, wherein the at least one code section comprises code that enables inverting said third signal to generate said in-phase component of said local oscillator signal whose frequency is a difference of a frequency of said first signal and a frequency of said second signal, wherein when said third signal is not inverted, said in-phase component of said local oscillator signal is generated with a frequency that is a sum of a frequency of said first signal and a frequency of said second signal.

9. The non-transitory machine-readable storage according to claim 7, wherein the at least one code section comprises code that enables inverting said fifth signal to generate said quadrature phase component of said local oscillator signal whose frequency is a sum of a frequency of said first signal and a frequency of said second signal, wherein when said fifth signal is not inverted, said quadrature phase component of said local oscillator signal is generated with a frequency that is a difference of a frequency of said first signal and a frequency of said second signal.

10. The non-transitory machine-readable storage according to claim 7, wherein the at least one code section comprises code that enables controlling of said direct digital frequency synthesizer utilizing one or more frequency control words.

11. The non-transitory machine-readable storage according to claim 7, wherein the at least one code section comprises code that enables dividing said base signal by a divide factor greater than one to generate a reference clock signal for said direct digital frequency synthesizer.

12. The non-transitory machine-readable storage according to claim 7, wherein said second signal is generated by dividing said base signal by a divide factor greater than one.

13. A system for processing signals, the system comprising:
one or more circuits that comprise a direct digital frequency synthesizer, wherein said direct digital frequency synthesizer enables generation of a first signal based on a base signal;
said one or more circuits comprise a phase shifter that enables generation of a second signal based on said base signal; and
said one or more circuits enable quadrature mixing of in-phase (I) and quadrature phase (Q) components of said first signal and in-phase (I) and quadrature phase (Q) components of said second signal to generate a local oscillator signal comprising an in-phase (I) component and a quadrature phase (Q) component, wherein said one or more circuits comprise:
a first mixer that enables mixing of said I component of said first signal and said Q component of said second signal to generate a third signal;
a second mixer that enables mixing of said I component of said second signal and said Q component of said first signal to generate a fourth signal;
a third mixer that enables mixing of said I component of said first signal and said I component of said second signal to generate a fifth signal;
a fourth mixer that enables mixing of said Q component of said first signal and said Q component of said second signal to generate a sixth signal;
a first adder circuitry that enables addition of said third signal and said fourth signal to generate said in-phase component of said local oscillator signal; and
a second adder circuitry that enables addition of said fifth signal and said sixth signal to generate said quadrature phase component of said local oscillator signal.

14. The system according to claim 13, wherein said first mixer enables inverting of said third signal to generate said in-phase component of said local oscillator signal whose frequency is a difference of a frequency of said first signal and a frequency of said second signal, wherein when said first mixer does not invert said third signal, said in-phase component of said local oscillator signal is generated with a frequency that is a sum of a frequency of said first signal and a frequency of said second signal.

15. The system according to claim 13, wherein said third mixer enables inverting of said fifth signal to generate said quadrature phase component of said local oscillator signal whose frequency is a sum of a frequency of said first signal and a frequency of said second signal, wherein when said third mixer does not invert said fifth signal, said quadrature phase component of said local oscillator signal is generated with a frequency that is a difference of a frequency of said first signal and a frequency of said second signal.

16. The system according to claim 13, wherein said one or more circuits comprise one or more processors that enable controlling of said direct digital frequency synthesizer utilizing one or more frequency control words.

17. The system according to claim 13, wherein said one or more circuits comprise one or more dividers that enable dividing said base signal by a divide factor greater than one to generate a reference clock signal for said direct digital frequency synthesizer.

18. The system according to claim 13, wherein said one or more circuits comprise one or more dividers that enable generation of said second signal by dividing said base signal by a divide factor greater than one.

19. A method for processing signals, the method comprising:
- generating by a direct digital frequency synthesizer, a first signal based on a base signal;
- generating a second signal based on said base signal;
- quadrature mixing in-phase (I) and quadrature phase (Q) components of said first signal and in-phase (I) and quadrature phase (Q) components of said second signal to generate a local oscillator signal comprising an in-phase (I) component and a quadrature phase (Q) component;
- mixing said I component of said first signal and said Q component of said second signal to generate a third signal;
- mixing said I component of said second signal and said Q component of said first signal to generate a fourth signal;
- mixing said I component of said first signal and said I component of said second signal to generate a fifth signal;
- mixing said Q component of said first signal and said Q component of said second signal to generate a sixth signal; and
- inverting said third signal to generate said in-phase component of said local oscillator signal whose frequency is a difference of a frequency of said first signal and a frequency of said second signal, wherein when said third signal is not inverted, said in-phase component of said local oscillator signal is generated with a frequency that is a sum of a frequency of said first signal and a frequency of said second signal.

20. A method for processing signals, the method comprising:
- generating by a direct digital frequency synthesizer, a first signal based on a base signal;
- generating a second signal based on said base signal;
- quadrature mixing in-phase (I) and quadrature phase (Q) components of said first signal and in-phase (I) and quadrature phase (Q) components of said second signal to generate a local oscillator signal comprising an in-phase (I) component and a quadrature phase (Q) component;
- mixing said I component of said first signal and said Q component of said second signal to generate a third signal;
- mixing said I component of said second signal and said Q component of said first signal to generate a fourth signal;
- mixing said I component of said first signal and said I component of said second signal to generate a fifth signal;
- mixing said Q component of said first signal and said Q component of said second signal to generate a sixth signal; and
- inverting said fifth signal to generate said quadrature phase component of said local oscillator signal whose frequency is a sum of a frequency of said first signal and a frequency of said second signal, wherein when said fifth signal is not inverted, said quadrature phase component of said local oscillator signal is generated with a frequency that is a difference of a frequency of said first signal and a frequency of said second signal.

21. A non-transitory machine-readable storage having stored thereon, a computer program having at least one code section for processing signals, the at least one code section being executable by a machine for causing the machine to perform steps comprising:
- generating by a direct digital frequency synthesizer, a first signal based on a base signal;
- generating a second signal based on said base signal;
- quadrature mixing in-phase (I) and quadrature phase (Q) components of said first signal and in-phase (I) and quadrature phase (Q) components of said second signal to generate a local oscillator signal comprising an in-phase (I) component and a quadrature phase (Q) component;
- mixing said I component of said first signal and said Q component of said second signal to generate a third signal;
- mixing said I component of said second signal and said Q component of said first signal to generate a fourth signal;
- mixing said I component of said first signal and said I component of said second signal to generate a fifth signal;
- mixing said Q component of said first signal and said Q component of said second signal to generate a sixth signal; and
- inverting said third signal to generate said in-phase component of said local oscillator signal whose frequency is a difference of a frequency of said first signal and a frequency of said second signal, wherein when said third signal is not inverted, said in-phase component of said local oscillator signal is generated with a frequency that is a sum of a frequency of said first signal and a frequency of said second signal.

22. A non-transitory machine-readable storage having stored thereon, a computer program having at least one code section for processing signals, the at least one code section being executable by a machine for causing the machine to perform steps comprising:
- generating by a direct digital frequency synthesizer, a first signal based on a base signal;
- generating a second signal based on said base signal;
- quadrature mixing in-phase (I) and quadrature phase (Q) components of said first signal and in-phase (I) and quadrature phase (Q) components of said second signal to generate a local oscillator signal comprising an in-phase (I) component and a quadrature phase (Q) component;
- mixing said I component of said first signal and said Q component of said second signal to generate a third signal;
- mixing said I component of said second signal and said Q component of said first signal to generate a fourth signal;
- mixing said I component of said first signal and said I component of said second signal to generate a fifth signal;
- mixing said Q component of said first signal and said Q component of said second signal to generate a sixth signal; and
- inverting said fifth signal to generate said quadrature phase component of said local oscillator signal whose frequency is a sum of a frequency of said first signal and a frequency of said second signal, wherein when said fifth signal is not inverted, said quadrature phase component of said local oscillator signal is generated with a frequency that is a difference of a frequency of said first signal and a frequency of said second signal.

23. A system for processing signals, the system comprising:
- one or more circuits that comprise a direct digital frequency synthesizer, wherein said one or more circuits enable generation of a first signal based on a base signal;
- said one or more circuits enable generation of a second signal based on said base signal; and said one or more circuits enable quadrature mixing of in-phase (I) and quadrature phase (Q) components of said first signal and in-phase (I) and quadrature phase (Q) components of said second signal to generate a local oscillator signal comprising an in-phase (I) component and a quadrature phase (Q) component, wherein said one or more circuits comprise:

a first mixer that enables mixing of said I component of said first signal and said Q component of said second signal to generate a third signal;

a second mixer that enables mixing of said I component of said second signal and said Q component of said first signal to generate a fourth signal;

a third mixer that enables mixing of said I component of said first signal and said I component of said second signal to generate a fifth signal;

a fourth mixer that enables mixing of said Q component of said first signal and said Q component of said second signal to generate a sixth signal; and said first mixer enables inverting of said third signal to generate said in-phase component of said local oscillator signal whose frequency is a difference of a frequency of said first signal and a frequency of said second signal, wherein when said first mixer does not invert said third signal, said in-phase component of said local oscillator signal is generated with a frequency that is a sum of a frequency of said first signal and a frequency of said second signal.

24. A system for processing signals, the system comprising:

one or more circuits that comprise a direct digital frequency synthesizer, wherein said one or more circuits enable generation of a first signal based on a base signal;

said one or more circuits enable generation of a second signal based on said base signal; and said one or more circuits enable quadrature mixing of in-phase (I) and quadrature phase (Q) components of said first signal and in-phase (I) and quadrature phase (Q) components of said second signal to generate a local oscillator signal comprising an in-phase (I) component and a quadrature phase (Q) component, wherein said one or more circuits comprise:

a first mixer that enables mixing of said I component of said first signal and said Q component of said second signal to generate a third signal;

a second mixer that enables mixing of said I component of said second signal and said Q component of said first signal to generate a fourth signal;

a third mixer that enables mixing of said I component of said first signal and said I component of said second signal to generate a fifth signal;

a fourth mixer that enables mixing of said Q component of said first signal and said Q component of said second signal to generate a sixth signal; and said third mixer enables inverting of said fifth signal to generate said quadrature phase component of said local oscillator signal whose frequency is a sum of a frequency of said first signal and a frequency of said second signal, wherein when said third mixer does not invert said fifth signal, said quadrature phase component of said local oscillator signal is generated with a frequency that is a difference of a frequency of said first signal and a frequency of said second signal.

* * * * *